United States Patent [19]

Day

[11] Patent Number: 5,345,968
[45] Date of Patent: Sep. 13, 1994

[54] ROTARY MAGNETIC VALVE FOR LOW NOISE LOW WEAR OPERATION

[75] Inventor: James Day, Scotia, N.Y.

[73] Assignee: General Electric Company, Schenectady, N.Y.

[21] Appl. No.: 36,572

[22] Filed: Mar. 24, 1993

[51] Int. Cl.⁵ .................... F16K 31/08; F16K 11/052
[52] U.S. Cl. .................... 137/625.46; 137/614.21; 251/129.11; 251/129.21; 251/65
[58] Field of Search ............ 251/129.11, 129.21, 251/129.12, 65, 208; 137/219, 614.18, 614.21

[56] References Cited

U.S. PATENT DOCUMENTS

| | | |
|---|---|---|
| 2,497,903 | 2/1950 | Muffly . |
| 2,883,150 | 4/1959 | Musser ................. 251/340 |
| 3,120,943 | 2/1964 | Donelan ............. 251/129.21 |
| 4,242,116 | 12/1980 | Aschberger et al. . |
| 4,262,496 | 4/1981 | Bell, Jr. . |
| 4,428,558 | 1/1984 | Odogaki et al. ............ 251/65 |
| 4,647,009 | 3/1987 | Idogaki et al. ......... 251/129.12 |
| 4,714,551 | 12/1987 | Bachhofer et al. . |
| 4,976,237 | 12/1990 | Bollinger ......... 251/129.11 X |

*Primary Examiner*—Arnold Rosenthal
*Attorney, Agent, or Firm*—Patrick R. Scanlon; Paul R. Webb, II

[57] ABSTRACT

A rotary magnetic valve including a cylindrical housing having flow passages in both ends and a magnetically-responsive valve closure assembly rotatively mounted therein. The valve closure assembly includes an armature mounted to rotate about the longitudinal axis of the housing and a shoe slideably disposed on each end of the armature. Each shoe is biased away from the armature and into contact with the inner end surfaces of the housing. A controller assembly is provided to rotate the valve closure assembly between a first position where flow through the valve is prevented and a second position where flow is permitted. The controller includes at least one permanent magnet for biasing the valve closure assembly into one of the positions and an electromagnet for rotating the valve closure assembly into the other position. A three-way valve is also possible.

25 Claims, 3 Drawing Sheets

ROTARY MAGNETIC VALVE FOR LOW NOISE LOW WEAR OPERATION

CROSS REFERENCE TO RELATED APPLICATIONS

This application is related to copending application entitled "Refrigeration System and Refrigerant Flow Control Apparatus Therefor," Ser. No. 07/612,290, filed Nov. 9, 1990 and now U.S. Pat. No. 5,228,308 and assigned to the same assignee as the present invention.

BACKGROUND OF THE INVENTION

This invention relates generally to magnetically operated valves and more particularly concerns a valve having a rotatable closure element which is rotated between open and closed positions by an electromagnet. The rotary magnetic valve is applicable to many uses and is particularly useful in dual evaporator refrigeration systems.

Energy efficiency is an extremely important factor in the design of refrigeration systems. This is particularly so for household refrigerators having multiple temperature requirements, e.g., fresh food and freezer compartments. The refrigeration cycle traditionally used in household refrigerators utilizes a single evaporator operated at the low freezer temperature. Refrigerator air is blown across the evaporator and the air flow is split so that a large part of the flow goes to the freezer compartment and the remainder goes to the fresh food compartment. This cycle thus produces a refrigeration effect which is appropriate for the freezer compartment but lower than need be for the fresh food compartment. As such, the traditional cycle is not as energy efficient as a cycle having two evaporators operating at different temperatures.

Thus, one cost effective approach to better energy efficiency has been the development of more efficient refrigeration cycles. For example, the above-mentioned U.S. Pat. No. 5,228,308 discloses an efficient dual evaporator, single compressor refrigeration cycle. U.S. Pat. No. 4,242,116 to Matthias Aschberger et al discloses another dual evaporator, single compressor cycle. Both of these cycles require a valving arrangement for selectively controlling the flow of refrigerant through the system.

Conventional solenoid valves will satisfy the flow control requirements but tend to operate at excessive noise and wear levels. For instance, U.S. Pat. No. 4,242,116 discloses a three-way magnetic valve which comprises a tubular housing having an axial bore hole with an inlet to the bore hole and an outlet at each end of the housing. A plunger-armature assembly is disposed in the bore hole and is moved longitudinally against a spring force by an electromagnet. Sealing cones on the ends of the plunger engage valve seats at the respective outlets for selectively closing the outlets. The action of the sealing cones striking the respective valve seats each time the plunger position is switched produces a relatively loud clicking noise and significant part wear. For these refrigeration cycles, it is estimated that a valve will need a 20 million cycle life.

Generally, it is important to make the sealing cones as small as possible because the noise they create increases as their weight increases. In addition, more energy will be required to move heavier sealing cones. Because the sealing cones must be small, the cross-sectional area of the outlet orifices is limited. In applications where a pressure drop is not desired, particularly for vapor phase flow, the orifice size limitation can be troublesome because as the orifice size is reduced, the pressure drop increases.

Accordingly, there is a need for a valve suitable for use in refrigeration systems which operates virtually silently and without substantial wear. There is an additional need for a valve in which the orifice size is not unduly limited, thereby avoiding unnecessary pressure drops.

SUMMARY OF THE INVENTION

The above-mentioned needs are met by the present invention which provides a rotary magnetic valve. The valve includes a housing comprising a cylindrical shell having a longitudinal axis, a first end piece attached to one end of the shell, the first end piece having a first flow passage formed therein, and a second end piece attached to another end of the shell, the second end piece having a second flow passage formed therein. Each one of the flow passages is bifurcated so as to have a single external port and two orifices formed on the inner surfaces of the respective end pieces.

A magnetically-responsive valve closure device is mounted in the housing for rotation about the longitudinal axis, and a controller is provided for selectively rotating the valve closure device between first and second positions. The valve closure device prevents fluid flow between the flow passages when in the first position and permits flow between the passages when in the second position. The controller includes at least one permanent magnet disposed along the shell in radial alignment with the orifices for biasing the valve closure device into the first position and an electromagnet disposed adjacent to the shell and out of radial alignment with the orifices for rotating the valve closure device into the second position. The electromagnet comprises a C-shaped core straddled over the cylindrical shell and a coil wound around the core. The coil is connected to a DC power source.

The valve closure device comprises a ferrous armature, a first shoe slideably disposed on one end of the armature, and a second shoe slideably disposed on another end of the armature. The first and second shoes are biased away from the armature and into abutment with the inner surfaces of the end pieces. Each one of the shoes covers the respective orifices when the valve closure device is in the first position.

Alternatively, a third independent flow passage can be provided in the second end piece to produce a three-way valve. In addition to preventing fluid flow between the first and second passages when in the first position and permitting flow between the first and second passages when in the second position, the valve closure device permits fluid flow between the first and third passages when in the first position and prevents fluid flow between the first and third passages when in the second position.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
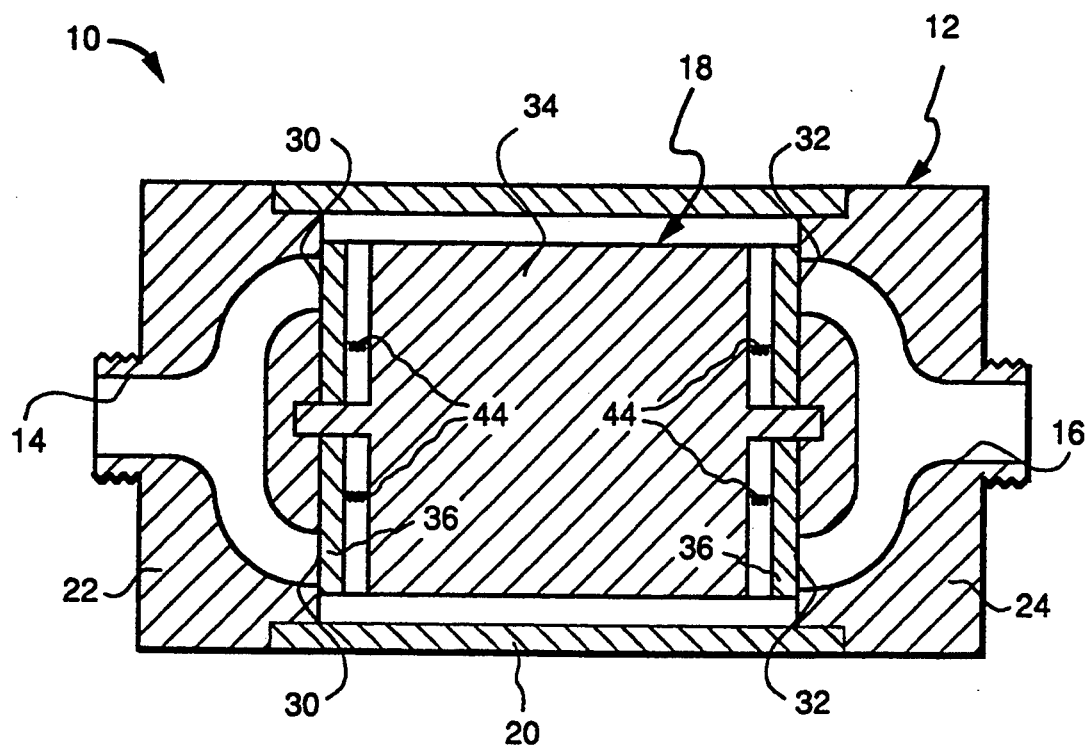
FIG. 1 shows a cross-sectional side view of the valve of the present invention.
Figure 2:
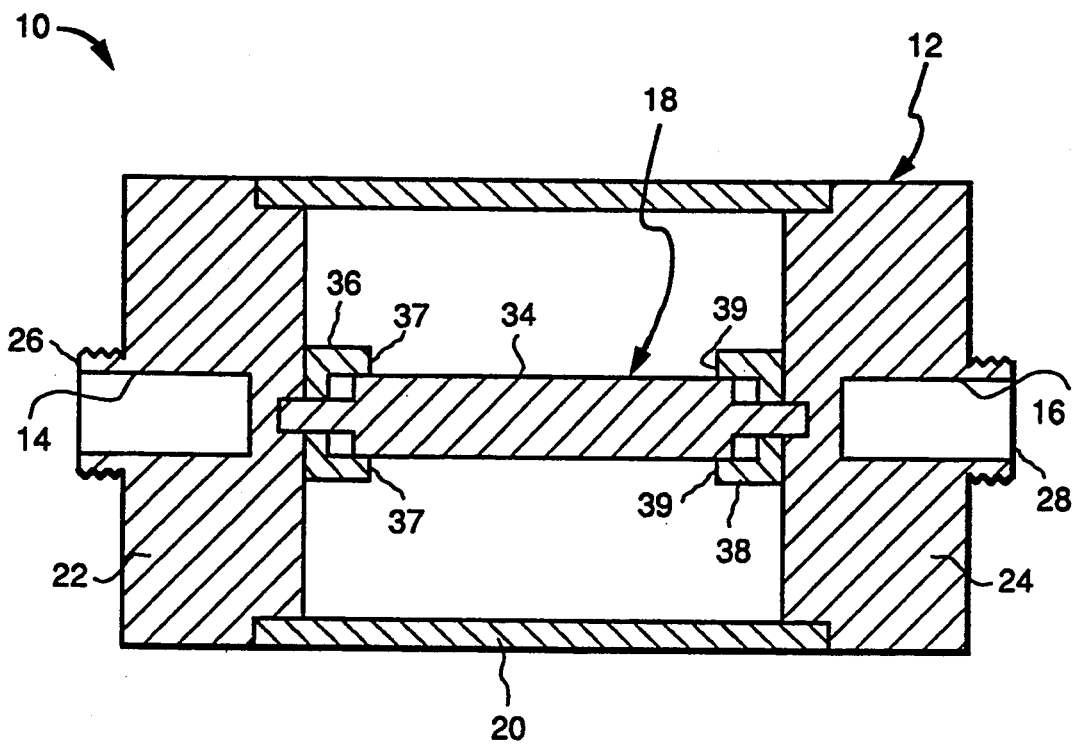
FIG. 2 shows a cross-sectional side view of the valve of the present invention rotated ninety degrees from the view of FIG. 1.

Referring to the drawings wherein identical reference numerals denote the same elements throughout the various views, FIG. 1 shows a cross-sectional view of a valve 10 of the present invention. FIG. 2 shows another cross-sectional view of the valve 10 rotated ninety degrees from the view of FIG. 1. The valve 10 comprises a hermetic housing 12 with flow passages 14,16 formed in respective ends thereof for permitting fluid flow in either direction through the housing 12. A valve closure assembly 18 is rotatively mounted inside the housing 12 to selectively open and close the valve 10.

The housing 12 comprises a hollow cylindrical shell 20 and two end pieces 22,24 attached to opposing ends of the cylindrical shell 20. The two end pieces 22,24 close the cylindrical shell 20 in a fluid-tight fashion so the housing 12 will be hermetically sealed. The cylindrical shell 20 and the end pieces 22,24 are made from a non-ferrous material which is unaffected by magnetic fields. The flow passages 14,16 are formed in respective ones of the end pieces 22,24. The flow passages 14,16 are bifurcated; that is, each flow passage 14,16 extends from a port 26,28 located in the respective outer surfaces of the end pieces 22,24, splits into two parts and ends at a pair of orifices 30,32 positioned diametrically on the respective inner surfaces of the end pieces 22,24. Each one of the first pair of orifices 30 is axially aligned with a corresponding one of the second pair of orifices 32. The bifurcation of the flow passages 14,16 provides two purposes. It permits the valve closure assembly 18 to be journaled along the longitudinal axis of the housing 12. The bifurcation also allows the total cross-sectional area of the flow passages 14,16 to be maximized, thereby avoiding excessive pressure drops. Each one of the ports 26,28 is externally threaded to permit connection to an appropriate element, such as a refrigerant line in a refrigeration system.

Figure 3:
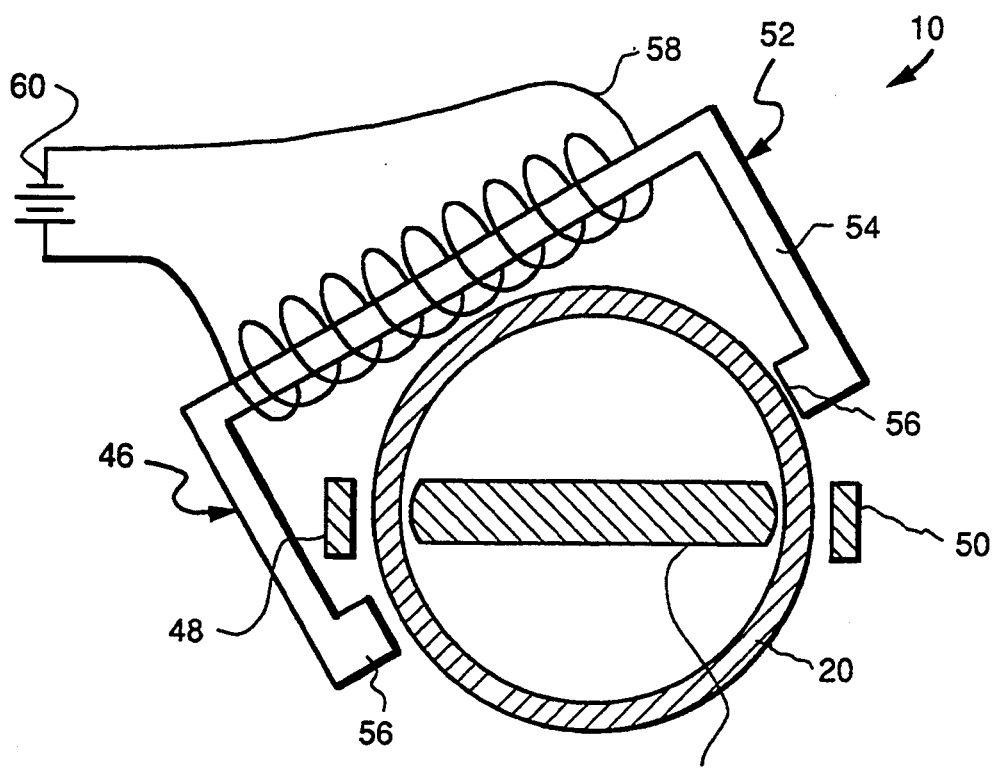
FIG. 3 shows a cross-sectional end view of the valve of the present invention with the valve closed.
Figure 4:
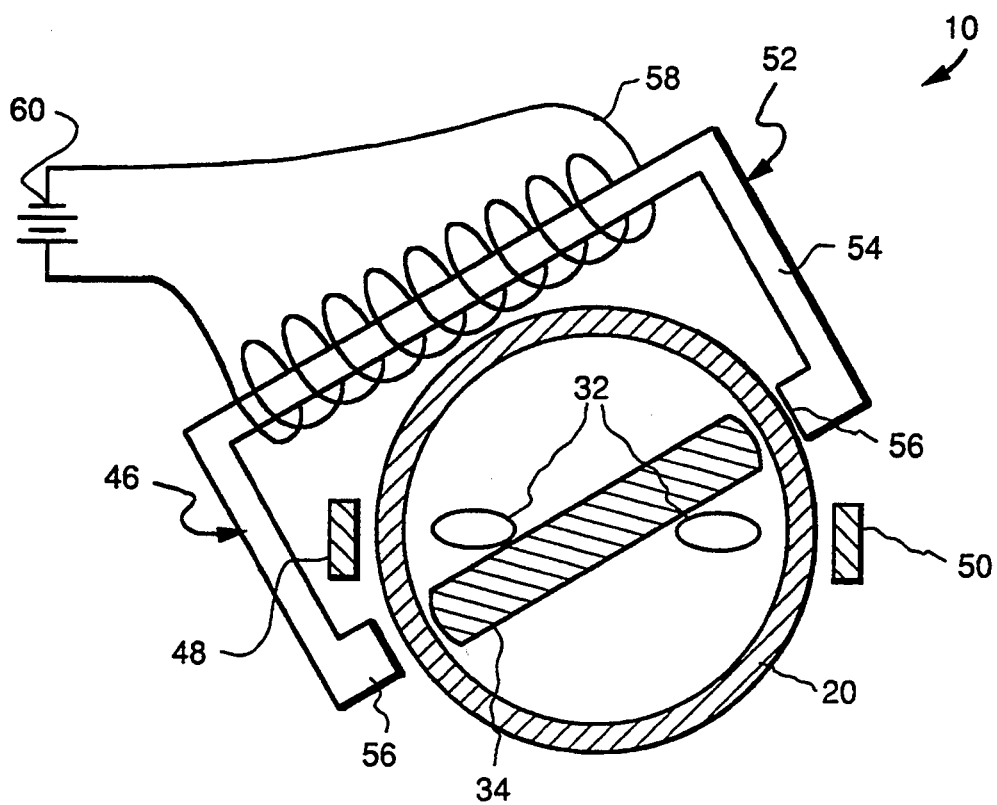
FIG. 4 shows a cross-sectional end view of the valve of the present invention with the valve open.

The valve closure assembly 18 comprises an armature 34 and two shoes 36,38 associated with opposing ends of the armature 34. The armature 34 is a flat, rectangular paddle member having a side-to-side width which is slightly less than the inside diameter of the cylindrical shell 20. As seen in FIGS. 3 and 4, the sides of the armature 34 are rounded with a radius of curvature corresponding to the inside diameter of the cylindrical shell 20. Thus, a gap of about 5 to 10 mils, preferably 8 mils, is formed between the cylindrical shell 20 and each side of the armature 34. The end-to-end length of the armature 34 is such that the armature 34 and the two shoes 36,38 fit between the two end pieces 22,24 with a very slight clearance. A pivot pin 40,42 extends outward from each end of the armature 34 and is journaled into the centers of the respective end pieces 22,24 so that the armature 34 is rotatable about the longitudinal axis of the cylindrical shell 20. The armature 34 is constructed of a ferrous material so as to be attracted to a magnetic field. Although the armature 34 is shown in the Figures as a solid piece, it can optionally be formed in a lighter configuration, such as a hollow rectangular frame. In fact, the armature 34 does not necessarily need to be entirely of ferrous material as long as it is sufficiently responsive to a magnetic field.

The shoes 36,38 are slideably disposed on respective ends of the armature 34. The shoes 36,38 are elongated members approximately as long as the width of the armature 34 and have two side flanges 37,39 extending over each face of the armature 34 for retaining the shoes 36,38 on the armature 34. Each shoe 36,38 is provided with a center hole which the respective pivot pins 40, 42 extend through. Springs 44 or other biasing means are disposed between the ends of the armature 34 and each shoe 36,38 to bias the shoes 36,38 away from the armature 34 and into contact with the inner surface of the respective end pieces 22,24. As mentioned above, there is just a slight clearance between the end pieces 22,24 and the ends of the armature 34 so that any axial movement of the shoes 36,38 is minimal. The shoes 36,38 are preferably made of or coated with a low friction material such as PTFE plastic. The width of the shoes 36,38 is sufficient to completely cover the orifices 30,32 in the inner surfaces of the end pieces 22,24 when aligned therewith.

Rotation of the valve closure assembly 18 is accomplished by a controller assembly 46 shown in FIGS. 3 and 4, which are both cross-sectional end views of the valve 10. FIG. 3 shows the valve 10 closed, and FIG. 4 shows the valve 10 open. The controller assembly 46 comprises a biasing component which maintains the valve closure assembly 18 in a rest position and an actuating component which rotates the valve closure assembly 18 out of the rest position. As shown in FIGS. 3 and 4, the valve closure assembly 18 is aligned with the orifices 30,32 (valve closed) when in the rest position and is not aligned with the orifices 30,32 (valve open) when disturbed from the rest position. However, this arrangement can be reversed. Specifically, the valve closure assembly 18 would be out of alignment with the orifices 30,32 (valve open) when in the rest position and placed into alignment (valve closed) when rotated out of the rest position.

In a preferred embodiment the biasing component is a pair of permanent magnets 48,50 disposed outside of the cylindrical shell 20. The permanent magnets 48,50 are elongated members disposed lengthwise along the outside of the cylindrical shell 20 on diametrically opposing sides and in radial alignment with the orifices 30,32. Although a two-magnet arrangement is preferred, other arrangements are possible. The permanent magnets 48,50 produce a magnetic field which attracts the armature 34, and thus the shoes 36,38, into alignment with the orifices 30,32, thereby closing the valve 10. The actuating component is an electromagnet 52 which, when energized, produces a stronger magnetic field than the permanent magnets 48,50. The electromagnet 52 comprises a C-shaped core 54 which is positioned to straddle the outside of the cylindrical shell 20 so that the core ends 56 are located at diametrically opposed locations outside of the cylindrical shell 20 which are not in radial alignment with the orifices 30,32. A coil 58 is wound around the core 54 and connected to a power source 60 to provide the necessary current. The power source 60 is preferably a DC source so that the electromagnet 52 maintains the valve closure assembly 18 in the open position without fluctuations.

In operation, the valve 10 is installed by connecting appropriate flow conduits to the two flow passage ports 26,28. Although the valve 10 can accept flow in either direction, assume for the purposes of illustration that fluid enters the valve 10 through the first flow passage 14 and exits through the second flow passage 16. The permanent magnets 48,50 hold the valve closure assembly 18 in the rest position as long as the electromagnet 52 is not energized. With the valve closure assembly 18 in the rest position, the shoes 36,38 cover and block the orifices 30,32 of both end pieces 22,24. The fluid pressure in the first flow passage 14 may be such that the first shoe 36 is not held tightly against the first end piece 22 by the spring bias, permitting fluid to enter the housing 12. However, the resultant fluid pressure inside the housing 12 will assist the spring bias of the second shoe 38 and force it against the second end piece 24, thereby sealing the second flow passage 16 and preventing flow through the valve 10.

When the electromagnet 52 is energized, a stronger magnetic field is produced which attracts the armature 34 and rotates the valve closure assembly 18 out of the rest position. The respective pairs of orifices 30,32 are thus placed in fluid communication to permit fluid flow through the valve 10. Once the electromagnet 52 is de-energized, the magnetic field of the permanent magnets 48,50 attracts the valve closure assembly 18 back to the rest position and closes the valve 10 again. As the valve closure assembly 18 moves back and forth between the open and closed positions, the springs 44 keep the shoes 36,38 in constant contact with the inner surfaces of the respective end pieces 22,24. Thus, the present invention avoids much of the noise and wear produced by the conventional valves. And since there is no plunger being moved in and out of contact with a valve seat, the size of the orifices is not as limited, thereby avoiding undue pressure drops. The orifice size of the present invention is also enhanced by the bifurcation of the flow passages 14,16.

Figure 5:
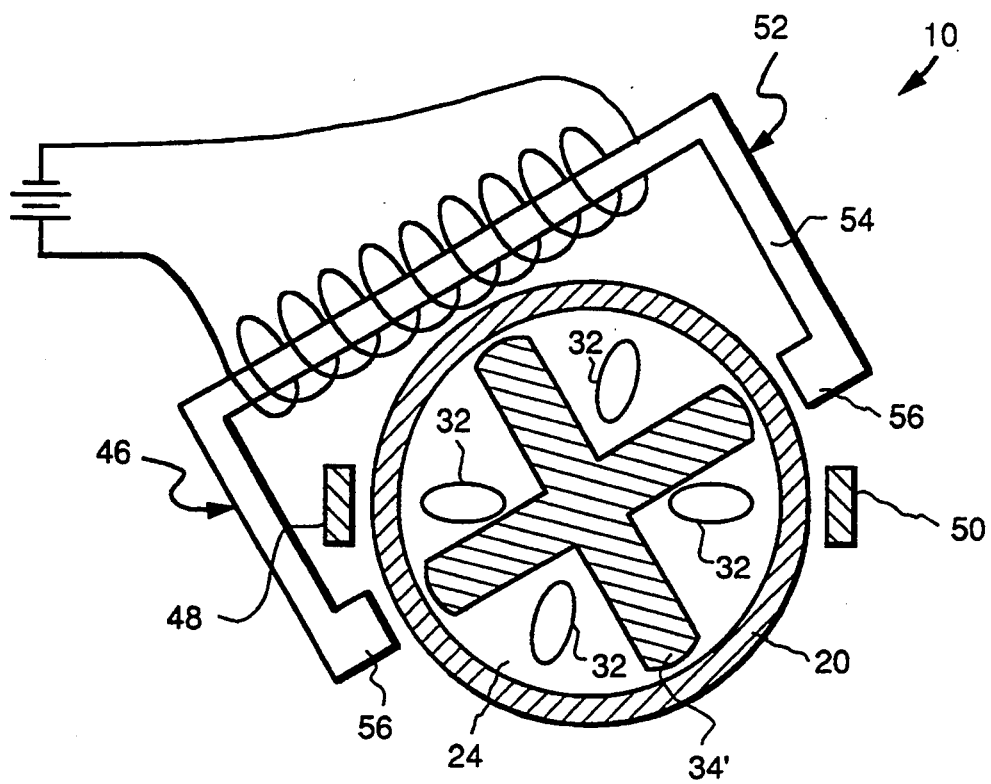
FIG. 5 shows a cross-sectional end view of an alternate embodiment of the present invention.

The total orifice size could be further increased by adding more orifices in each one of the end pieces 22,24 and accordingly modifying the valve closure assembly 18. For instance, FIG. 5 shows one alternate embodiment of the valve 10 in which four orifices 32 are symmetrically formed on the inner surface of the second end piece 24. Although not seen in the cross-sectional end view of FIG. 5, four corresponding orifices are similarly formed in the first end piece 22. As before, individual orifices in the first end piece 22 are axially aligned with individual orifices in the second end piece 24. Each group of four orifices converges into a respective port formed on the outer surfaces of the respective end pieces 22,24, thereby defining the first and second flow passages 14,16. The valve closure assembly of FIG. 5 comprises a cross-shaped armature 34' and matching cross-shaped shoes (not shown in FIG. 5) associated with opposing ends of the armature 34'. Thus, the armature 34' and the matching shoes have four branches which can be rotated in and out of alignment with the orifices on the two end pieces 22,24. As before, the valve closure assembly is selectively rotated between open and closed positions by the controller assembly 46.

The present invention as described above is configured so that the valve closure assembly 18 closes the valve 10 when in the rest position. This is good when the valve 10 is used in such an application that it is mostly closed. However, if the valve 10 is used in an application where it is mostly open, wherein the electromagnet 52 would be mostly energized, then the above-described configuration would consume a lot of energy holding the valve 10 open. Thus, a second configuration would be employed for uses in which the valve would be mostly open. In this second configuration, the placement of the permanent magnets 48,50 and the electromagnet 52 could be reversed so that the valve 10 would be open when the valve closure assembly 18 was in the rest position and would be closed when the electromagnet 52 was energized.

The permanent magnets 48,50 described above are one preferred embodiment for the biasing component of the controller assembly 46. Other embodiments are possible. For instance, the permanent magnets 48,50 could be replaced with one or more helical springs disposed on the pivot pins 40,42 and connected to the armature 34 and the end pieces 22,24. The helical spring or springs would exert a torsional force on the armature 34 to bias it into the rest position. The electromagnet 52, when energized, would create a magnetic field which was strong enough to overcome the spring bias. Another alternative is to replace the permanent magnets 48,50 with a second electromagnet. In this case, the two electromagnets would be alternately energized so that only one was energized at a time. However, this configuration would consume more energy because one or the other of the two electromagnets would always be energized.

Figure 6:
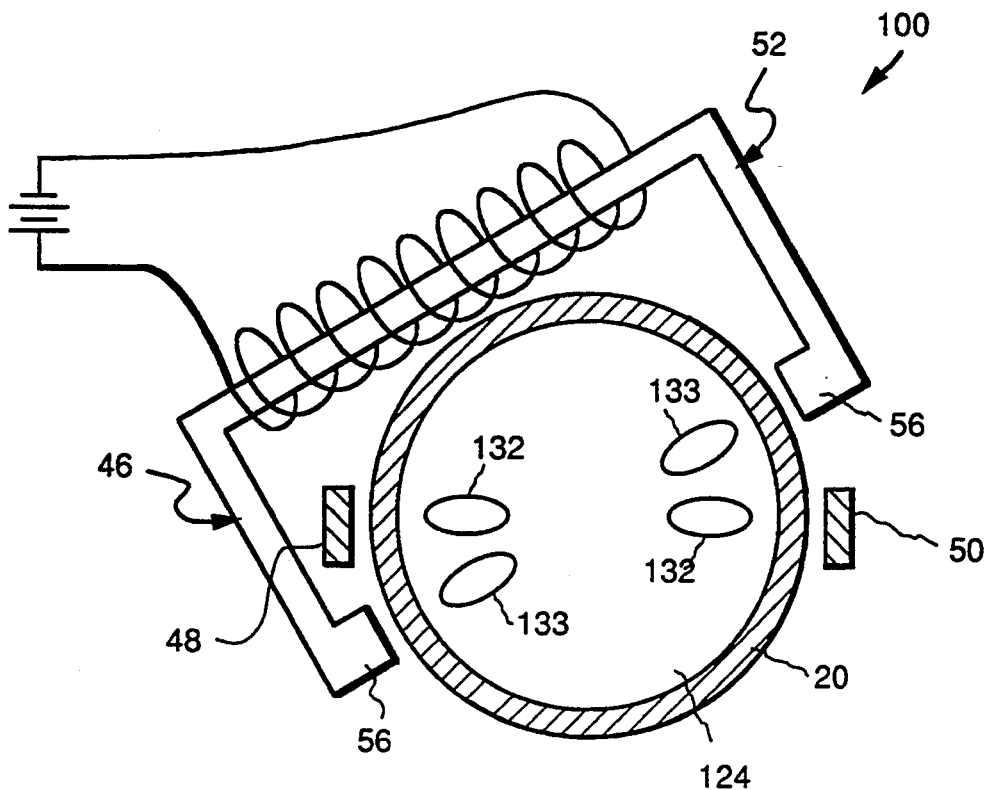
FIG. 6 shows a cross-sectional end view of the three-way valve which is another embodiment of the present invention.

FIG. 6 shows another embodiment of the present invention which comprises a three-way valve 100. The three-way valve 100 of FIG. 6 is the same as the valve 10 described above in that it comprises the cylindrical shell 20, the first end piece 22 with the bifurcated flow passage 14 (not shown in FIG. 6) attached to one end of the shelf 20, and the valve closure assembly 18 (not shown) rotatively mounted in the shell 20. The valve 100 also has the same controller assembly 46 for selectively positioning the valve closure assembly 18. The valve 100 differs from the prior valve 10 in that it includes a second end piece 124 having two independent bifurcated flow passages, instead of just one. Each flow passage comprises a pair of orifices 132,133 positioned diametrically on the inner surface of the second end piece 124. The two orifices 132,133 of each pair converge into a separate port (not shown) located in the outer surface of the second end piece 124. There is no fluid communication between the flow passages in the second end piece 124.

The first pair of orifices 132 is radially aligned with the permanent magnets 48,50, and the second pair of orifices 133 is radially aligned with the core ends 56 of the electromagnet 52. Neither pair of orifices 132,133 in the second end piece 124 is axially aligned with the pair of orifices 30 in the first end piece 22; thus, the pair of orifices 30 is not aligned with either the permanent magnets 48,50 or the electromagnet 52. Thus, when in the rest position (i.e., aligned with the permanent magnets 48,50), the valve closure assembly 18 blocks the first pair of orifices 132, preventing flow therethrough while permitting flow through the second pair of orifices 133. When the electromagnet 52 is activated, the valve closure assembly 18 is rotated out of the rest position to block the second pair of orifices 133, preventing flow therethrough while permitting flow through the first pair of orifices 132. Because the pair of orifices 30 in the first end piece 22 are not axially aligned with either pair of orifices 132,133 in the second end piece 124, they are not blocked by the valve closure assembly 18 in either position.

The foregoing has described an electrically operated valve which is suitable for use in dual evaporator refrigeration systems and is virtually silent. The valve also avoids significant pressure drops. While specific embodiments of the present invention have been described, it will be apparent to those skilled in the art that various modifications thereto can be made without departing from the spirit and scope of the invention as defined in the appended claims. For instance, while two- and three-way valves have been described, it should be noted that the present invention could embrace even more than three-way flow.

What is claimed is:

1. A valve comprising:
   a housing having a hollow interior and first and second passages in fluid communication with said hollow interior;
   a valve closure device having first and second ends, said valve closure device comprising a paddle rotatively mounted in said hollow interior about an axis which intersects said first and second ends; and
   a controller for selectively rotating said valve closure device between a first position where said first and second ends block said first and second passages, respectively, and a second position where said first and second ends do not block said first and second passages.

2. The valve of claim 1 wherein said controller comprises at least one permanent magnet situated to attract said valve closure device to one of said first and second positions and an electromagnet having a stronger magnetic field than said permanent magnet situated to attract said value closure device to the other one of said first and second positions.

3. The valve of claim 1 wherein said valve closure device includes a first shoe associated with one end of said paddle and a second shoe associated with another end of said paddle.

4. The valve of claim 3 wherein each of said first and second shoes is biased away from said paddle.

5. The valve of claim 3 wherein said paddle is an armature attracted to a magnetic field.

6. The valve of claim 5 wherein said paddle comprises a ferrous material.

7. The valve of claim 5 wherein said controller comprises a first magnet situated to attract said valve closure device to one of said first and second positions and a second magnet situated to attract said valve closure device to the other one of said first and second positions.

8. The valve of claim 7 wherein first magnet is a permanent magnet and said second magnet is an electromagnet having a stronger magnetic field than said permanent magnet.

9. The valve of claim 8 wherein said electromagnet comprises a C-shaped core straddled over said housing and a coil wound around said core.

10. The valve of claim 9 wherein said coil is connected to a DC power source.

11. The valve of claim 1 wherein said housing includes a third passage in fluid communication with said hollow interior, said valve closure device permitting fluid flow between said first and third passages when in said first position and preventing fluid flow between said first and third passages when in said second position.

12. A valve having first and second states, said valve comprising:
    a housing having a hollow interior and first and second passages in fluid communication with said hollow interior;
    an armature rotatively mounted in said hollow interior;
    means for biasing said armature into a first position; and
    an electromagnetic actuator for rotating said armature into a second position, said electromagnetic actuator comprising an electromagnetic having a C-shaped core straddled over said housing, said valve assuming its first state when said armature is in said first position and said valve assuming its second state when said armature is in said second position.

13. The valve of claim 12 wherein fluid flow between said first and second passages is prevented when said valve assumes its first state and fluid flow between said first and second passages is permitted when said valve assumes its second state.

14. The valve of claim 12 wherein fluid flow between said first and second passages is permitted when said valve assumes its first state and fluid flow between said first and second passages is prevented when said valve assumes its second state.

15. The valve of claim 12 wherein said means for biasing said armature into a first position comprises a permanent magnet.

16. The valve of claim 12 wherein said housing includes a third passage in fluid communication with said hollow interior.

17. A valve comprising;
    a cylindrical shell having a longitudinal axis, a first end piece at one end thereof, said first end piece having a first passage formed therein, and a second end piece at another end thereof, said second end piece having a second passage formed therein;
    a magnetically-responsive valve closure device mounted in said shell for rotation about said longitudinal axis;
    at least one permanent magnet disposed along said shell, said at least one permanent magnet biasing said valve closure device into a first position in which fluid flow between said first and second passages is prevented; and
    an electromagnet disposed adjacent to said shell, said electromagnet rotating said valve closure device into a second position in which fluid flow between said first and second passages is permitted.

18. The valve of claim 17 wherein said valve closure device comprises a ferrous armature, a first shoe slideably disposed on one end of said armature, and a second shoe slideably disposed on another end of said armature.

19. The valve of claim 18 wherein each one of said first and second passages is bifurcated so as to have a single external port and two orifices formed on an inner surface of the respective one of said first and second end pieces.

20. The valve of claim 19 wherein each of said first and second shoes is biased away from said armature and into abutment with an inner surface of a respective one of said first and second end pieces.

21. The valve of claim 20 wherein each one of said first and second shoes covers the respective ones of said two orifices when said valve closure device is in said first position.

22. The valve of claim 19 wherein said at least one permanent magnet is situated in radial alignment with said orifices and said electromagnet is situated out of radial alignment with said orifices.

23. The valve of claim 22 wherein said electromagnet comprises a C-shaped core straddled over said cylindrical shell and a coil wound around said core.

24. The valve of claim 23 wherein said coil is connected to a DC power source.

25. The valve of claim 17 wherein said second end piece includes a third passage formed therein, said valve closure device permitting fluid flow between said first and third passages when in said first position and preventing fluid flow between said first and third passages when in said second position.

* * * * *